United States Patent

[11] 3,623,499

| [72] | Inventor | Rene Bernard |
| | | 15 Avenue Berthelat, Lyon 7,(Rhone), France |
| [21] | Appl. No. | 836,804 |
| [22] | Filed | June 26, 1969 |
| [45] | Patented | Nov. 30, 1971 |
| [32] | Priority | Feb. 7, 1968 |
| [33] | | France |
| [31] | | 3523 |

[54] STOP VALVES
13 Claims, 9 Drawing Figs.

[52] U.S. Cl. ................................................. 137/329.01, 251/172
[51] Int. Cl. ............................................... F16k 3/10, F16k 43/00
[50] Field of Search ............................................. 137/329, - 329.01–329.06; 251/170, 172

[56] References Cited
UNITED STATES PATENTS

| 218,399 | 8/1879 | Post | 137/329.01 |
| 546,922 | 9/1895 | Graffin | 137/329.01 |
| 596,885 | 1/1898 | Jennings | 137/329.01 |
| 2,217,834 | 10/1940 | Corbin, Jr. | 137/329.01 |
| 2,749,940 | 6/1956 | Bronson | 137/329.01 X |

FOREIGN PATENTS

| 1,257,207 | 2/1961 | France | 137/329.01 |

Primary Examiner—M. Cary Nelson
Assistant Examiner—David R. Matthews
Attorney—Karl F. Ross ABSTRACT: A stop valve of the kind including a valve seat and a pair of movable blocking discs selectively movable into position on a valve seat wherein at least one closable opening is provided to enable one disc to be withdrawn therethrough when the other is urged against the seat. The valve body may be of cruciform shape formed of thin-walled tubes which are welded together and a piston may be provided to urge either or each disc against the seat.

René Bernard
Inventor

By Karl J. Ross
Attorney

STOP VALVES

This invention relates to stop valves of the kind including a valve seat and a movable blocking disc. The replacement of a worn seal on the disc of a stop valve at the present time involves taking the installation in which the valve is connected out of service for some time, since the valve has to be partially dismantled for the purpose.

It is an object of the invention to provide as improved stop valve which renders it unnecessary to take the installation out of service when the valve disc is to be reconditioned.

The invention consists in a stop valve comprising a body having a valve seat formed therein, a pair of blocking discs selectively movable into an operative position on said seat and means for urging the operatively positioned disc against said seat to close the valve, at least one closable opening being provided in the body to enable one of the discs to be withdrawn therethrough while the other is urged against the seat.

In normal operation, the valve is closed by the working disc which can be withdrawn through the closable opening. When this disc is out of use, the valve is closed by means of the spare disc and the worn working disc is then replaced. The subsequent closure of the valve will be effected by means of the spare disc.

The invention applies particularly to situations where the valve employs a seal of low elasticity, for example of metal or polyamide, because in such an instance the life of the valve between two seal changes is reduced to just a few hundreds or even tens of operations.

If the average operational life of a valve disc is on the order of a hundred operations, the spare or standby disc will enable 10,000 operations to be carried out without making it necessary to interrupt the operation of the system. The number of operations can be made unlimited if the valve contains a second closable opening which enables the standby disc to be replaced.

In an advantageous embodiment of the invention, the valve body has a generally cruciform shape and the two discs are movable in tow coaxial arms of that body, one of these arm containing the closable opening.

Embodiments of the invention will now be described with reference to the accompanying diagrammatic drawing in which.

Figure 1:
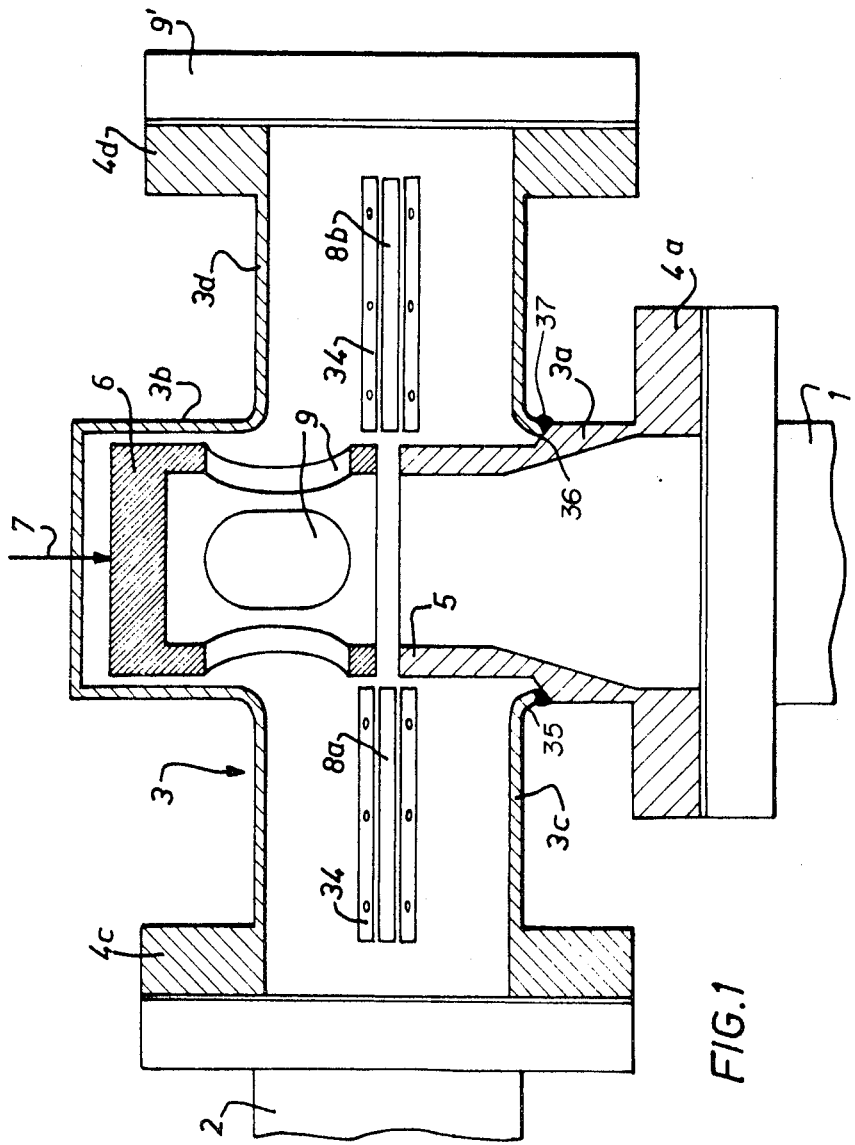
FIG. 1 is an axial section through a first embodiment of the invention.

The valve illustrated in FIG. 1 is arranged between two pipe sections 1 and 2. It comprises a body 3 which is cruciform in shape and each of the branches 3a–3c which has a section corresponding to that of the pipes 1 and 2. The branch 3a terminates in a flange 4a which makes it possible to connect the body to the pipe 1 and which is integral with an internal seat 5. The opposite branch 3b contains a free piston 6 as well as a mechanism which is schematically illustrated at 7 and which makes it possible with the help of the piston 6 to force a blocking disc 8a or 8b into contact with the seat 5. The branch 3c terminates in a flange 4c which makes it possible to connect the valve body to the pipe 2. Finally, the branch 3d terminates in a flange 4d which enables a cover 9 to be attached in a sealed fashion. The body preferably takes the form of thin sections of tube welded together and made of elastically deformable material; this arrangement of the body and the use of a free piston makes it possible to compensate for any disalignment between seat and piston as a consequence of thermal distortion following cycles of heating to more than 300° C, to which the valve may be subjected in operation.

As indicated hereinbefore, the valve comprises two blocking discs 8a and 8b each of which can be moved into position on the seat 5 and which are slidably mounted, with a certain clearance, in guides 34; the latter can be constituted simply by elastic wires 34a (FIG. 8) stretched parallel to the internal wall of the tube and held at the appropriate spacing by a soldered connection at each end to bracket diametrically opposite marginal disc portions. These wires make it possible to maintain the discs 8a, 8b out of contact with the seat 5 or the piston 6 during adjustment and also furnish the necessary force to loosen the disc after a long period of heating in the closed position. When the valve is open, the disc 8a is located in the branch 3c of the valve body while the disc 8b is located in the opposite branch 3d. Fluid can thus circulate freely between the flanges 4c and 4a through the free space left between the seat 5 and the piston 6. In order to facilitate this circulation of fluid, the piston 6 may, as illustrated, be given a hollow shape and have openings 9 so that some of the fluid can flow from the flange 4c to the flange 4a through the piston.

In order to close the valve, it is merely necessary to move the blocking disc 8b onto the seat 5 and to force it into contact therewith by means of the piston 6. The valve is opened in the reverse manner by removing the piston 6 from the disc 8b and retracting the disc into the interior of the branch 3d of the valve body.

The opening and closing maneuvers of the valve can be repeated as long as the disc 8b is in good condition.

When the disc 8b is worn and requires changing, the valve is closed by applying the disc 8a against the seat 5 to isolate the system connected to the pipeline 1. Then the cover 9' is removed and the disc 8b is replaced by anew one; after this, the cover 9 is replaced. At the next occasion of opening the valve, the disc 8b is withdrawn into the branch 3d; subsequent operations of closing the valve are carried out by using the new disc 8b until the latter too is completely worn out.

Figure 2:
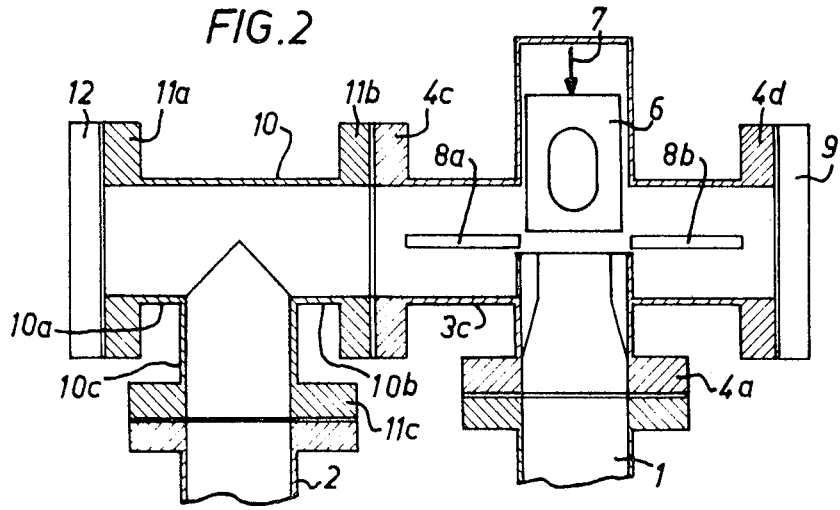
FIG. 2 is a view similar to that of FIG. 1 of a second embodiment.

FIG. 2 illustrates a variant of the embodiment of FIG. 1 in which the disc 8a as well as the disc 8b can be replaced when it has worn, so that the number of operations which the valve can carry out is unlimited. To the flange 4c an auxiliary valve body 10 is secured. The coaxial branches 10a and 10b of this body include flanges 11a and 11b which respectively serve to fix in position a cover 12 and to secure the body 10 to the body 3; the third branch 10c has flange 11c which provides a connection to the line 2.

Thus, the valve disc 8a can be exchanged by removing the cover 12, after the valve has been closed off by means of the disc 8b.

Figure 3:
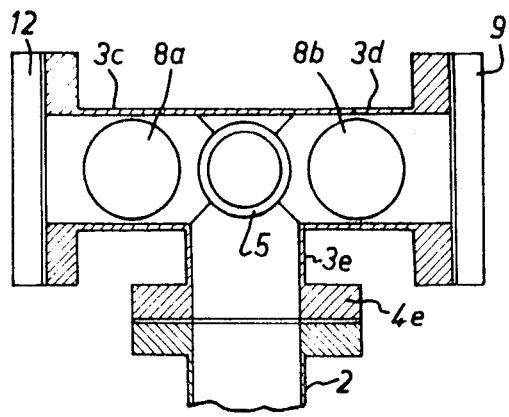
FIG. 3 is a view in axial section of yet another embodiment.

The same applies to the embodiment of FIG. 3 in which each of the branches 3c and 3d is closed off by a cover 12 or 9. The valve body has a supplemental branch 3e perpendicular to the plane of the four other branches and opening inside the body opposite the piston 6, that is to say above the plane of displacement of the discs 8a and 8b; this branch 3e terminates in a flange 4e providing connection to the pipe 2. It is then possible to change the disc 8a or 8b, after removing the cover 12 or the cover 9 as the case may be.

The mechanism which enables the piston 6 to be forced against the disc 8a or 8b, displacing it and holding it in position on its seat may take various forms.

This mechanism may include, for example, a screw which is sealed by an elastic diaphragm. However, if metal discs are used, the displacement which the piston has to make is relatively small, being on the order of 1 mm., and this makes it possible to employ pneumatic or hydraulic systems which are substantially more advantageous.

Figure 4:
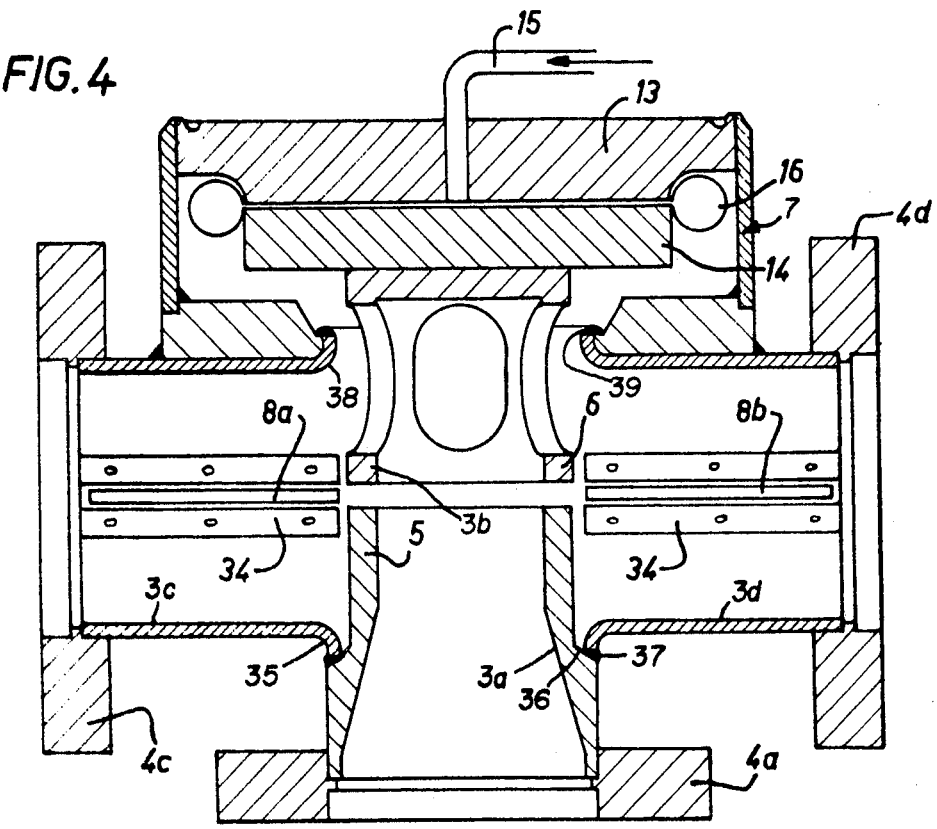
FIG. 4 is an axial section of a valve in accordance with the invention and comprising pneumatic means for forcing one or the other of the blocking discs onto the seat.

Thus, in the embodiment of FIG. 4, a pneumatic press 7 has been provided comprising a fixed plate 13 secured to the valve body and a moving plate 14 mounted on the piston 6, the space between the two plates 13, 14 being connected to the pressurized fluid supply 15. The two plates are connected to one another by a seal or gasket 16, preferably of strap form, this because I have realized, following protracted trials, that this kind of device is far better able to resist high pressures and fatigue phenomena than conventional accordion-type gaskets.

Figure 5:
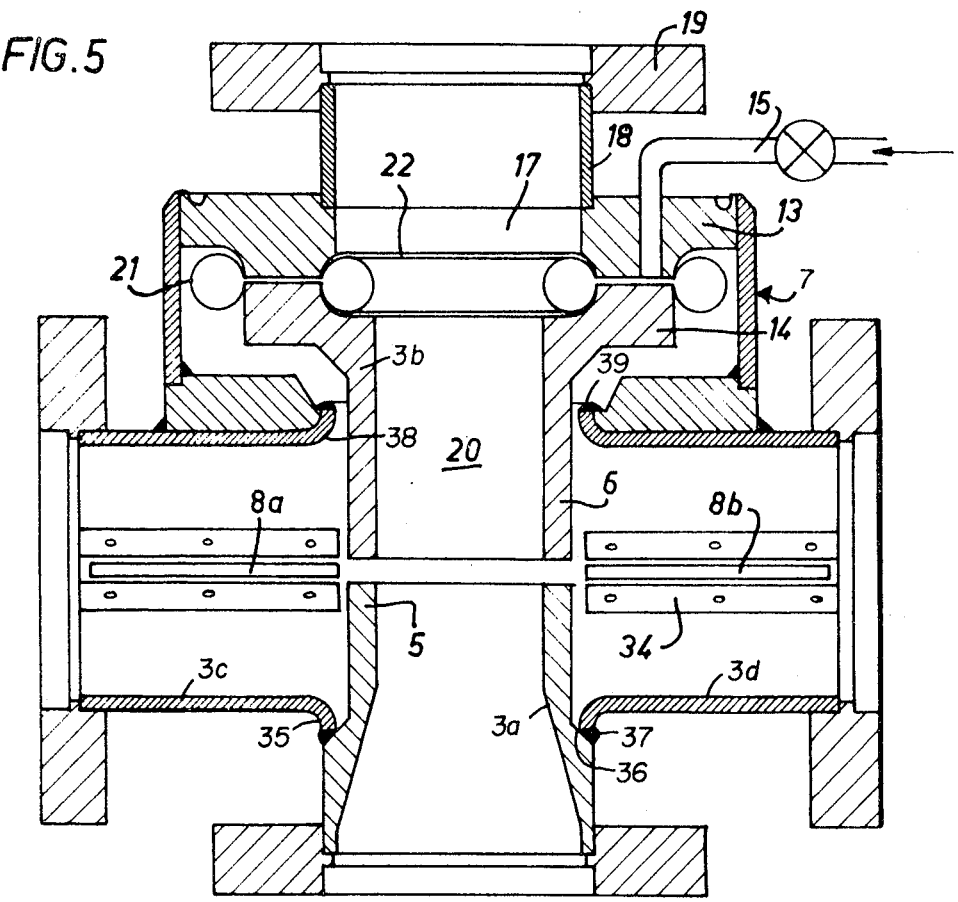
FIG. 5 illustrates a modification of the valve of FIG. 4.

FIG. 5 illustrates a modification of the valve of FIG. 4, which is of the straight-through kind. In this valve, the fixed plate 13 contains a central opening 17 which is connected through a tube 18 to a flange coupling 19. The moving plate 14 and the piston 6 contain a central passage 20. The two plates are connected to one another by an external seal or gasket 21 and by an internal seal or gasket 22. In the example illustrated, the moving plate and the piston are integral with one another but, or course, they could equally well take the form of separate components attached to each other.

When the seals used between the disc 8a or 8b and the seat 5, as well as between this disc and the piston 6, are made of a very hard material which does not easily distort, for example of metal, then the parallelism of the two surfaces between which the joint is compressed must satisfy very high requirements of accuracy.

When using pneumatic control for the displacement of the piston 6, as shown in FIGS. 4 and 5, the parallelism of the two seats can be ensured at the time of assembly by fitting a shim which determines the locations of the seats prior to the soldering of the piston 6 to the plate 14. Nevertheless, the parallelism of these seats may be disturbed in operation as a consequence of residual distortion of the pneumatic gaskets 16, 21, 22 or residual expansion produced by the successive heating phases.

The manufacture of the valve body from tubes welded together in a cruciform fashion, overcomes the problem of parallelism between the seats. In other words, under the effect of the closing force, the tubes which make up the branches or ports 3c and 3d distort to adopt a substantially elliptical section so that the planes of the seats shift. If the blocking disc located between them is flat and uniform in thickness and the two seat planes make a certain angle with one another at the moment at which they come into contact with the disc, then the distortion of the valve body under the closing force will first correct this lack of parallelism and subsequently ensure perfect contact with the disc for a proper seal. For proper operation of the valve, it is merely necessary to endure that these distortions on the part of the valve body remain within the elastic limit and this is easily achieved by appropriate choice of the thickness of the tube used for the construction.

For example, for a valve in which the internal section of the stainless-steel tube is approximately 50 mm., a thickness of 1.5 to 2.5 mm. will be chosen so that the loading of the disc produces an elastic distortion of 5/100 to 5/10 mm., assuming a maximum seating thrust or around 2 metric tons.

Experience indicates that a distortion (displacement of the seat in the direction of the thrust) of 1 to 2/10 mm. gives the best results.

It will be noted that the three branches 3b, 3c, 3d of body 3 form a unitary structure in FIG. 1 into which the port 3a, carrying the valve seat 5, is inserted by way of a neck 35 constituted by an out-turned lip on that structure. Port 35 is provided with a beveled outer shoulder 36 which comes to rest against the neck 35 and is welded thereto by a bead 37. In FIGS. 4 and 5, on the other hand, the confronting piston-guiding branch 3b is also designed as a separate port surrounding or inserted through a similar neck 38 in the valve structure 3c, 3d and welded thereto by a bead 39, the connection between the port 3a and the unitary tube structure 3c, 3d being the same as in FIG. 1.

As far as the means used to displace the blocking discs 8a and 8b are concerned, they may be constituted for example by a conventional screw mechanism or by a pneumatic or hydraulic mechanism, the latter being sealed off by a metal bellows arrangement.

Figure 6:
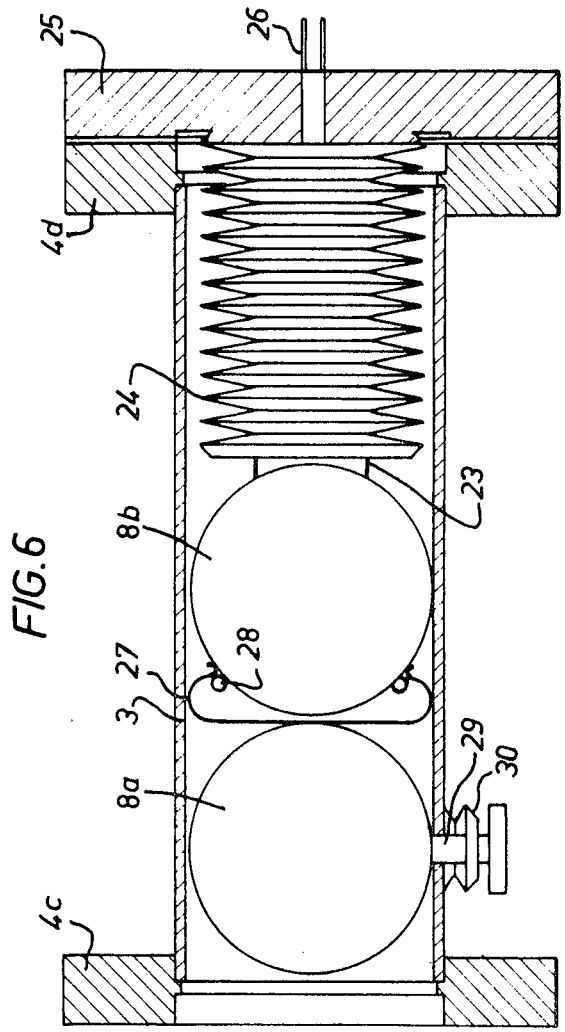
FIG. 6 is an axial sectional view of a valve in accordance with the invention and shows the pneumatic means employed to displace the blocking discs.

Thus, in FIG. 6 the working disc 8b is fixed to a rod 23 which is itself fixed to the flat face of a metal bellows 24. The mouth of the bellows is secured in sealed fashion to a closure plate 25 which is itself fixed to the flange 4d and contains a hole communicating with a passage 26 which can be connected either to a source of pressurized fluid or to a vacuum source.

In addition the standby blocking disc 8a carries, on the one of its faces which is adjacent the disc 8b, a clip 27 in which disc 8b can engage through the medium of fingers 28 if it is forced sufficiently far back; the clip may, of course, also be carried by the disc 8b and be arranged to engage the disc 8a. The length of this clip substantially equals the diameter of the body 3, so that it accurately determines the position of the disc 8a. The latter may be immobilized in its standby position by a lock 29 which in this case is manually controlled and can be sealed off by an elastic diaphragm 30.

In order to put the spare disc 8a into operation, it is merely necessary to push back the working disc 8b so that it engages in the clip 27, to unlock the disc 8a and to displace the assembly of the two yieldably coupled discs towards the plate or lid 25 after the release of the retaining means 29.

Figures 7, 8:
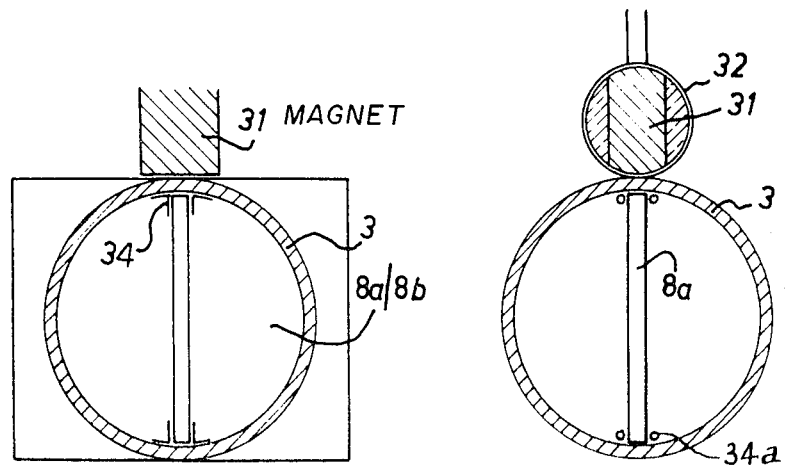
FIG. 7 is a transverse sectional view of a valve in which the discs can be displaced by means of magnets.
FIG. 8 is a view similar to that of FIG. 7, through a further embodiment, taken on the line VIII—VIII of FIG. 9.

In the embodiment of FIG. 7, the disc 8a or 8b is made of a magnetic stainless alloy while the body 3 of the valve is made of a nonmagnetic stainless alloy. It is then possible to displace the disc by means of an external magnet 31. If the plane of the disc is vertical, then the disc is, in a manner of speaking, suspended from the magnet. Preferably, the disc will be received with a certain clearance, for example of 0.5 mm., in the body 3, so that when it is displaced by the magnet 31 it rolls in frictionless fashion on the wall of the housing and thus follows the movement of the magnet with a high degree of precision.

Each of the magnets 31 can be displaced by any desired means, for example by means of a screw or a rack. However, if the press 7 is pneumatically controlled, as in the embodiment of FIG. 4, it will likewise be advantageous to pneumatically displace the magnets 31.

Figure 9:
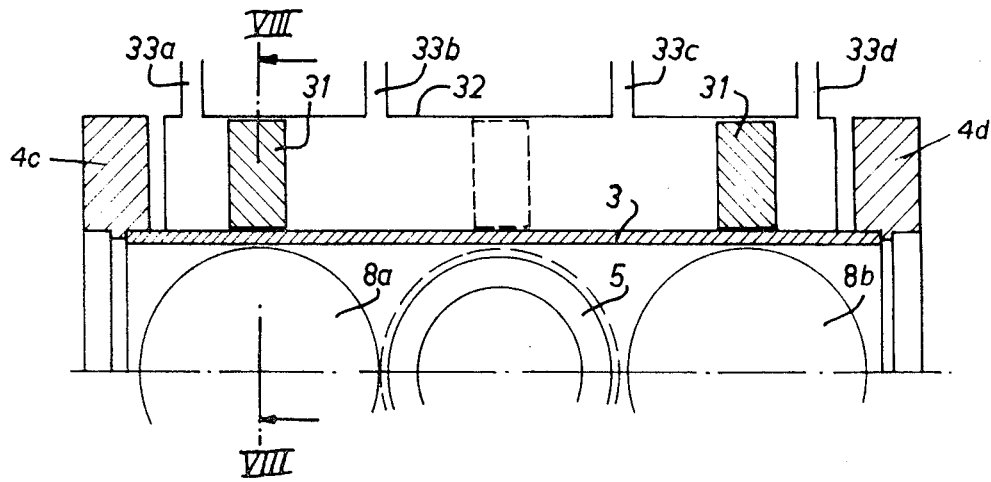
FIG. 9 is a view in axial section of the valve of FIG. 8.

Thus, in the embodiment of FIGS. 8 and 9, the two magnets 31 are assembled in a pneumatic tube 32 containing four airfeed orifices 33a, 33b, 33c and 33d.

It goes without saying that the invention is in no way limited to the embodiments described and illustrated here but covers a number of alternative embodiments.

What I claim as my invention and desire to secure by Letters Patent of the United States is:

1. A stop valve comprising a valve body with a plurality of ports including a first port and a second port opening in opposite directions along one axis and further including a third port and a fourth port opening in opposite directions along another axis orthogonal to said one axis, at least said third and fourth ports being branches of a unitary tubular structure of elastically deformable material provided between said third and fourth ports with an out-turned lip forming an open neck, said first port being a tubular insert extending through said neck and having an outer peripheral shoulder welded onto said lip, said insert terminating in a seat within said structure located substantially in an axial plane of said third and fourth ports; axially movable piston means in said second port confronting said seat, said body forming a flow path between said first port and another of said ports other than said second port; shutter means movable in said axial plane into and out of registry with said seat for selectively blocking and unblocking said flow path; and mechanism for driving said piston means toward said seat to press said shutter means onto the latter in a flow-blocking position.

2. A stop valve as defined in claim 1 wherein said shutter means comprises a pair of discs independently slidable in said axial plane for alternate registry with said seat, said third port forming a closable access opening for the removal of one of said discs upon concurrent obstruction of said seat by the other disc.

3. A stop valve as defined in claim 2 wherein said discs are provided with flexible guide means engaging marginal portions thereof.

4. A stop valve as defined in claim 3 wherein said guide means comprises two pairs of parallel wires bracketing said marginal portions.

5. A stop valve as defined in claim 2 wherein said one of said one of said discs is provided with control means extending outwardly through said third port and operable to shift said one of said discs past said seat into proximity with said other disc, the latter being provided with releasable retaining means for holding same offset from said seat, said discs being further provided with yieldable coupling means enabling entrainment of said other disc by said one of said discs into registry with said seat upon release of said retaining means and preparatorily to removal of said one of said discs from said valve body.

6. A stop valve as defined in claim 1 wherein said second port is an integral part of said valve body, said first port being an insert terminating in said seat and passing through an opening in said valve body.

7. A stop valve as defined in claim 6 wherein said valve body has an out-turned lip framing said opening, said insert having an external shoulder bearing upon said lip and welded thereto.

8. A stop valve comprising a valve body with a first port centered on a first axis and a second port centered on a second axis perpendicular to said first axis, said body defining a flow path between said ports; an extension of said port forming a valve seat substantially in an axial plane of said second port; a working valve disc and a spare valve disc independently movable in said axial plane for selective registry with said seat; piston means in said valve body confronting said seat, said piston means being operable from without to press a valve disc in registry with said seat against the latter for blocking said flow path, said spare disc being normally withdrawn into said second port, said working disc being withdrawable into a port of said valve body on the side of said seat opposite said second port for unblocking said flow path; and removable closure means on said part of said valve body giving access to said working disc for removing same from said valve body.

9. A stop valve as defined in claim 8 wherein said closure means comprises a lid provided with an actuator for the displacement of said working disc.

10. A stop valve as defined in claim 9 wherein said actuator includes a bellows mounted on the inside of said lid.

11. A stop valve as defined in claim 9 wherein said discs are provided with yieldable coupling means for enabling entrainment of said spare disc by said working disc into registry with said seat upon a shifting of said working disc into proximity with said spare disc, further comprising releasable retaining means in said second port for normally holding said spare disc offset from said seat.

12. A stop valve as defined in claim 11 wherein said coupling means comprises a clip on one of said discs and a formation engageable by said clip on the other of said discs.

13. A stop valve as defined in claim 8, further comprising two pairs of guide wires parallel to said second axis extending from said second port past said seat into said port of said valve body and bracketing diametrically opposite marginal portions of each of said discs.

* * * * *